UNITED STATES PATENT OFFICE 2,312,535

NAPHTHOQUINONE OXIDES AND METHOD OF PREPARING THE SAME

Louis F. Fieser, Belmont, Mass., assignor to Research Corporation, New York, N. Y., a corporation of New York No Drawing. Application July 23, 1940, Serial No. 347,042

9 Claims. (Cl. 260—348)

This invention relates to 1,4-naphthoquinone-2,3-oxides wherein one or more hydrogen atoms of the naphthoquinone ring system are substituted by the same or different alkyl and/or β-alkenyl radicals and to a process for the production of such oxides.

The 1,4-naphthoquinone oxides embraced by the invention are represented by the general formula

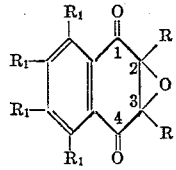

and each R stands for hydrogen or an alkyl or a β-alkenyl group, at least one R being an alkyl or a β-alkenyl group, and each $R_1$ stands for hydrogen or an alkyl group.

In this disclosure an alkyl group is understood to be a saturated monovalent hydrocarbon group and a β-alkenyl group is understood to be a monovalent unsaturated hydrocarbon group.

The preparation of the oxide of 1,4-naphthoquinone by treating it with aqueous hypochlorites has been reported. (Zincke, Ber., 25, 3602 (1892). Attempts to apply this process to alkyl and alkenyl substituted 1,4-naphthoquinones have resulted in failure. The reaction either does not proceed to completion or secondary reactions are involved so that a complex mixture of material is obtained which is extremely difficult to purify. In addition, the process is inconvenient in its application due to the fact that extremely large volumes of liquid must be handled.

Weitz, Schobbert and Seibert, Ber., 68, 1165 (1935) prepared the oxide of 1,4-naphthoquinone by treating this quinone in methanol with 30% $H_2O_2$ and 2N NaOH (20 cc. per 3.2 g. of quinone). The reaction was slow, allowing opportunity for destruction of the sensitive quinone by the alkali, no yield was recorded (and presumably therefore was low), and no evidence was presented to show that the reaction is applicable to any other examples in the α-naphthoquinone series. This process surely could not be applicable to the preparation of the oxides of the 2- or 3-β-alkenyl substituted α-naphthoquinones, which are highly sensitive to and rapidly destroyed by strong alkalies of the type of NaOH or KOH.

Even with 2 or 3 alkyl substituted quinones, the method, if applicable, doubtless would give but poor yields, for the sensitivity of the resulting oxides to alkali has been fully established.

I have discovered that napththoquinone and its alkyl and/or β-alkenyl derivatives react with peroxides such as hydrogen peroxide in the presence of carbonates of the group including sodium, potassium, lithium and ammonium carbonates to give high yields of the corresponding pure naphthoquinone oxides. The reaction proceeds very rapidly and the process is easy to use and produces products which are easily purified. In general, the method consists in adding aqueous sodium carbonate and hydrogen peroxide solutions to a solution or suspension of the naphthoquinone in a suitable solvent of the group including methyl and ethyl alcohol and dioxan. 2,3-oxides of the 1,4-naphthoquinone are formed.

The oxides possess anti-hemorrhagic activity and are useful for the preparation of other naphthoquinone derivatives as is shown by the fact that certain of the oxides react with strong alkali or acid to form hydroxy-naphthoquinones.

In the examples given below, preferred procedures in accordance with the invention are given but it is to be understood that modifications may be made without departing from the spirit and scope of the invention and that these examples are given by way of illustration and not of limitation.

A general procedure in accordance with the invention is as follows. One part by weight in grams of the selected 1,4-naphthoquinone is dissolved in ethyl alcohol and treated at 45–75° C. with one to three parts by volume in cubic centimeters of 30% hydrogen peroxide followed by a solution of 1/10 to 1 part by weight in grams of sodium carbonate in 2 parts by volume in cubic centimeters of water. Heat is evolved, the yellow quinone color is discharged and inorganic salts separate. After 5 to 15 minutes or after the quinone color is discharged the mixture is diluted with water whereupon the 1,4-naphthoquinone oxide separates out. The product is filtered off and recrystallized from dilute ethyl alcohol. Ethyl alcohol, petroleum ether, or a petroleum ether-ethyl ether mixture may also be used for recrystallization.

Using this method, the oxides shown in the following table have been prepared:

| Naphthoquinone | M. P. of oxide | Cryst. form. of oxide | Analysis | | | |
|---|---|---|---|---|---|---|
| | | | Carbon | | Hydrogen | |
| | | | Found | Calc. | Found | Calc. |
| 2-methyl-1,4-naphthoquinone | 95.5–96.5 | Long needles | 70.38 | 70.20 | 4.36 | 4.26 |
| 2,3-dimethyl-1,4-naphthoquinone | 104.0–104.5 | do | 71.26 | 71.27 | 5.09 | 4.99 |
| 2,6-dimethyl-1,4-naphthoquinone | 97–98 | Prisms | 71.23 | 71.27 | 5.07 | 4.99 |
| 2,7-dimethyl-1,4-naphthoquinone | 91–92 | Slender needles | 71.29 | 71.27 | 5.09 | 4.99 |

*Example 1*

Preparation of 2-farnesyl- and 2-geranyl-1,4-naphthoquinone-2,3-oxides

To a solution of 0.37 gram of 2-farnesyl-1,4-naphthoquinone in 10 cc. of dioxan is added a solution of 0.2 gram of sodium carbonate and 1 cc. of 30% hydrogen peroxide in 3 cc. of water. The mixture is allowed to stand for 24 hours at room temperature and then 10 cc. of ethyl alcohol and 1 cc. of hydrogen peroxide added. Then, after several days, the nearly colorless mixture is diluted with water and extracted with ethyl ether. The extract is washed thoroughly with water, clarified with Norite, dried and evaporated, giving 0.27 gram of a faintly yellowish oil.

Analysis: Calculated for $C_{25}H_{30}O_3$—carbon 79.33, hydrogen 7.99; found—carbon 78.99, hydrogen 8.16.

When covered with 10% ethyl alcohol potassium hydroxide solution, the oily oxide rapidly dissolves to a deep red solution and in a few minutes the bright red potassium salt of 2-hydroxy-1,4-naphthoquinone having the melting point of 186° C. separates. The methyl ether prepared by treatment with methanol and sulfuric acid melts at 183–184° C.

2-geranyl-1,4-naphthoquinone-2,3-oxide was prepared using the above procedure and was obtained as a faintly yellowish oil.

*Example 2*

Preparation of 2-phytyl-1,4-naphthoquinone-2,3 oxide 0.5 gram of 2-phytyl-1,4-naphthoquinone, 0.5 cc. of 30% hydrogen peroxide and 0.5 gram of anhydrous sodium carbonate dissolved in 1 cc. of water are processed according to the method outlined in Example 2. About 0.47 gram of a straw-colored liquid is obtained.

Analysis: calculated for $C_{30}H_{44}O_2$—carbon 79.58, hydrogen 9.81; found—carbon 79.90, hydrogen 9.76.

The product, when heated with alcoholic alkali, gives a temporary green color which changes to a reddish brown. In chicks, it shows anti/hemorrhagic activity when administered at a dosage of 100–200 micrograms.

I claim:

1. Compounds of the formula

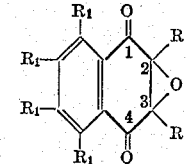

in which one R is a β-alkenyl group, the other R is a member of the group consisting of hydrogen and monovalent aliphatic hydrocarbon groups and each $R_1$ is a member of the group consisting of hydrogen and alkyl.

2. Compounds as defined in claim 1 in which one R is a β-alkenyl group and the other R is an alkyl group.

3. 2-farnesyl-1,4-naphthoquinone-2,3-oxide.

4. Process for the production of 1,4-naphthoquinone oxides which comprises reacting a 1,4-naphthoquinone with a peroxide in the presence of an alkali carbonate and a neutral organic solvent.

5. Process as defined in claim 4 in which the peroxide is hydrogen peroxide.

6. Process as defined in claim 4 in which the alkali carbonate is sodium carbonate.

7. Process as defined in claim 4 in which the neutral organic solvent is a member of the group consisting of ethyl alcohol, methyl alcohol and dioxan.

8. Process as defined in claim 4 in which the peroxide is hydrogen peroxide, the alkali carbonate is sodium carbonate and the neutral organic solvent is a member of the group consisting of methyl alcohol, ethyl alcohol and dioxan.

9. Process as defined in claim 4 in which the naphthoquinone is a member of the group represented by the formula

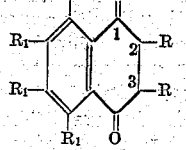

in which at least one R stands for a monovalent aliphatic hydrocarbon group, the other R being a member of the group consisting of hydrogen and monovalent aliphatic hydrocarbon groups, and each $R_1$ stands for a member of the group consisting of hydrogen and alkyl.

LOUIS F. FIESER.